United States Patent
Moren et al.

(10) Patent No.: US 11,126,966 B2
(45) Date of Patent: Sep. 21, 2021

(54) SYSTEMS AND METHODS FOR A WEB BASED INSPECTION COMPLIANCE REGISTRY AND COMMUNICATION TOOL

(75) Inventors: Andrew Stanton Moren, Gig Harbor, WA (US); Robert J. Moren, Gig Harbor, WA (US)

(73) Assignee: TEGRIS, INC., Gig Harbor, WA (US)

( * ) Notice: Subject to any disclaimer, the term of this patent is extended or adjusted under 35 U.S.C. 154(b) by 1138 days.

(21) Appl. No.: 12/011,202

(22) Filed: Jan. 23, 2008

(65) Prior Publication Data
US 2009/0157521 A1    Jun. 18, 2009

Related U.S. Application Data

(60) Provisional application No. 60/886,269, filed on Jan. 23, 2007, provisional application No. 60/977,870, filed on Oct. 5, 2007, provisional application No. 60/981,091, filed on Oct. 18, 2007, provisional application No. 60/981,784, filed on Oct. 22, 2007, provisional application No. 60/969,905, filed on Sep. 4, 2007, provisional application No. 60/981,782, filed on Oct. 22, 2007.

(51) Int. Cl.
*G06Q 10/10*    (2012.01)
(52) U.S. Cl.
CPC ................... *G06Q 10/10* (2013.01)
(58) Field of Classification Search
CPC ............................. G06Q 50/163; G06Q 10/10
USPC ....................................................... 705/313
See application file for complete search history.

(56) References Cited

U.S. PATENT DOCUMENTS

| | | | | |
|---|---|---|---|---|
| 6,446,053 | B1* | 9/2002 | Elliott | G06Q 10/06 703/1 |
| 7,831,628 | B1* | 11/2010 | Silva | G06Q 30/0283 705/400 |
| 2002/0082937 | A1 | 6/2002 | Retherford | |
| 2003/0171957 | A1* | 9/2003 | Watrous | 705/4 |
| 2004/0044696 | A1* | 3/2004 | Frost | 707/200 |
| 2004/0139053 | A1 | 7/2004 | Haunschild | |
| 2004/0177326 | A1 | 9/2004 | Bibko et al. | |

(Continued)

OTHER PUBLICATIONS www.buildingreports.com retrieved from archive.org any linkage Sep. 4, 2004.*

(Continued)

*Primary Examiner* — Lynda Jasmin
*Assistant Examiner* — Ehrin L Pratt
(74) *Attorney, Agent, or Firm* — Richard T. Black; Foster Garvey PC

(57) ABSTRACT

A method for using a web registry to track the inspection compliance of an owned asset including notifying an owner of an asset that an inspection is needed to comply with a code. Electronically transmitting a list of at least one qualified inspector to a user. Receiving a completed inspection uploaded from an inspector. Transmitting the completed inspection to an approving authority. Completing a monetary transaction between the asset owner and the inspector when the inspection is approved by the approving authority. A system for a web based compliance registry including a database configured to store owned asset information. A user interface in data communication with the database configured to show owned asset information on the display. A handheld device configured to wirelessly connect to the user interface and with the database in order to input and view owned asset data wirelessly and specific information based on its global position.

16 Claims, 24 Drawing Sheets

(56) References Cited

U.S. PATENT DOCUMENTS

| | | | |
|---|---|---|---|
| 2005/0108038 A1* | 5/2005 | Gober | G06Q 10/06 705/324 |
| 2005/0128083 A1 | 6/2005 | Puzio et al. | |
| 2006/0123010 A1 | 6/2006 | Landry et al. | |
| 2006/0235611 A1* | 10/2006 | Deaton | G01C 15/00 701/491 |
| 2006/0258292 A1 | 11/2006 | Kato et al. | |
| 2007/0005273 A1 | 1/2007 | Heidl et al. | |
| 2008/0084291 A1* | 4/2008 | Campion | G08B 29/123 340/514 |
| 2008/0114638 A1* | 5/2008 | Colliau | G06Q 10/06314 705/7.19 |

OTHER PUBLICATIONS

Annual Hydrant Inspection Procedures, [online], 2001, [retrieved on Jul. 20, 2020], Retrieved from the Internet: http://www.firehydrant.org/info/hinsp1.html, pp. 1-4 (Year: 2001).*

Stump, J. et al., "Utilizing Tomorrow's Technology to Mange America's Tunnel Highway," International Bridge Conference, Pittsburgh, PA Jun. 14, 2004.

Buildingreports.com, Inc., screenshot labeled Exhibit G available to customers in 2003.†

Buildingreports.com, Inc., "Wireless Setup Guide Express" labeled Exhibit H available to customers in 2005.†

Buildingreports.com, Inc., original website homepage labeled Exhibit I available to customers in 2001.†

Buildingreports.com, Inc., device record screen capture labeled Exhibit J available to customers in 2001.†

Buildingreports.com, Inc., "Document Repository" labeled Exhibit K available to customers in 2003.†

Buildingreports.com, Inc., screen capture labeled Exhibit L available to customers in 2005.†

Buildingreports.com, Inc., "Firescan Online Inspection Reports" labeled Exhibit A published in 2004.†

Buildingreports.com, Inc., "Fire Alarm and Life Safety System Inspection Certificate" labeled Exhibit B available to customers in 2003.†

Buildingreports.com, Inc., customer invoice labeled Exhibit C from 2005.†

Buildingreports.com, Inc., cached screenshot labeled Exhibit D available to customers beginning in 2001.†

Buildingreports.com, Inc., cached screenshots labeled Exhibits E and F available to customers in 2003.†

\* cited by examiner
† cited by third party

HydrantScout

Create Hydrant

| Field | Value |
|---|---|
| Hydrant Number | |
| Authority OrganizationID | City of Mollalla |
| Address 1 | |
| Address 2 | |
| City | |
| State | |
| Zip Code | |
| Foundation Type | Concrete |
| Barrel Type | Dry Type |
| Base Connection | Bolts |
| Barrel Color | Blue |
| Top Color | Blue |
| Nozzle Color | Blue |
| Manufacture Year | |
| Install Date | |
| Base Size | |
| Base Height | |
| Make | |

Cancel   Save & Done   Save & New

*Fig. 8*

HydrantScout

Search Criteria

Select Saved Query ▼
Save Query
[ Clear ]
[ Search ]

Hydrant# [ ]
City [ Oregon City ]
State [ ]
Zip [ ]
Make [ ]
Model [ ]

Hydrant Search

[ Cancel ]

| Action | Image | Hydrant # | Address | Make | Model | Barrel | Top | Nozzle |
|---|---|---|---|---|---|---|---|---|
| Details | | | 606 Main St Oregon City, OR 97045 | | | Orange | Orange | Orange |
| Details | | | 288 6th St Oregon City, OR 97045 | | | | | Orange |
| Details | | | 288 7th Street Oregon City, OR 97045 | | | Orange | Orange | Orange |
| Details | | | 686 Mail St Oregon City, OR 97045 | | | | | Orange |
| Details | | | 132 9th St Oregon City, OR 97045 | MH | | Orange | Orange | Orange |
| Details | | | 888 Main St Oregon City, OR 97045 | MH | | | | Orange |
| | | | 523 SR-43 | | | Orange | Orange | Orange |

Change page: < 1 2 3 4 5 > | Displaying page 1 of 5, terms 1 to 20 of 97.

*Fig. 9*

Hydrant Details

- Inspection
- ConditionReport
- Test
- Service Record
- RecommendedMa-
  itenence Hydrant Number: 344

Address

GPS: Lat:45.334380, Long -122.540233 ... R

Line 1: 2200 – Mauri North Shore
Line 2:
City, State, Zip: Oregon City    OR    ST045

Make:
Install Date:
Distance from CL:
Wrench Type:
Base Size:
Base Connection:
Base Elevation:
Special Markings:
Notes:

Model:
Barrel Type:
Side Of Road:
Nozzle Coeff:
Gate Valve:

Barrel Color: Blue
Top Color: Blue
Nozzle Color: Blue

Save

No Image Loaded

Nozzles

Nozzle Height Size Fitting

No records to display

*Fig. 11*

HydrantScout

Customizable Screen Maintenance

HydrantScout Web Manager ▼    Create Hydrant Wizard ▼

| Included | Name | Description |
|---|---|---|
| ☑ | Hydrant Number | Hydrant Number |
| ☑ | AuthorityOrganLisbonID | AuthorityOrganLisbonID |
| ☑ | Address 1 | Address 1 |
| ☑ | Address 2 | Address 2 |
| ☑ | City | City |
| ☑ | State | State |
| ☑ | Zip Code | Zip Code |
| ☑ | Foundation Type | Foundation Type |
| ☑ | Barrel Type | Barrel Type |
| ☑ | Base Connection | Base Connection |
| ☑ | Barrel Color | Barrel Color |

Cancel    Save

*Fig. 13*

SYSTEMS AND METHODS FOR A WEB BASED INSPECTION COMPLIANCE REGISTRY AND COMMUNICATION TOOL

PRIORITY CLAIM

This application claims priority to and incorporates all of the following by reference in their entirety U.S. Patent Provisional Application Nos. 60/886,269 filed on Jan. 23, 2007, 60/977,870 filed on Oct. 5, 2007, 60/981,091 filed Oct. 18, 2007, and 60/981,784 filed on Oct. 22, 2007.

This application incorporates all of the following by reference in their entirety U.S. Patent Provisional Application Nos. 60/969,905 filed on Sep. 4, 2007, and 60/981,782 filed on Oct. 22, 2007.

BACKGROUND OF THE INVENTION

There are many assets that are owned around the world that require compliance with a code, local rule, state law, or federal law. Compliance in most of these cases requires a periodic inspection of the owned asset. An example of owned assets requiring annual or regular inspection are fire sprinkler systems, fire alarm systems, kitchen hood systems, fire extinguishers, emergency lighting systems, backflow preventers, bridges, fire hydrants, catch basins, retention ponds, electrical systems, heating/venting/air conditioning systems, plumbing systems, aircraft, vehicles, school transportation vehicles, cranes, powerplants, dams, stormwater runoff, animals, industrial sites, environmental interests, housing, real estate, boilers, farm equipment, viaducts, tunnels, businesses, financials, pharmaceutical caches, weapon caches, amusement parks/rides, elevators, escalators, pilings, piers, safety equipment, kitchens, and others. For purposes of a non limiting example a fire hydrant will be used as an owned asset throughout the specification, however it should be readily appreciated that any owned asset may be substituted for the fire hydrant.

In order to ensure that a fire hydrant is working and is capable to dispense water the hydrant is preferably inspected annually. The hydrant is usually inspected by a range of individuals including but not limited to a citizen, an owner, a water purveyor, a firefighter, and/or a fire marshal. An inspector will record information about the hydrants location and operability. The completed inspection may be recorded in local neighborhood records (privately owned hydrant), a firehouse or in a computer system stored locally in an inspectors office. Most of these inspections are not available globally and generally are not available at the time of a fire. If a hydrant is not inspected a fire crew could waste valuable time trying to find water for their hoses from a malfunctioning hydrant. A hydrant also could be leaking water or be otherwise unsafe, which may not be discovered without an inspection. In most areas very few hydrants are inspected because of the large number of hydrants, the lack of a working inspection enforcement and tracking system and because there is not currently a way to use the inspection information at the time of a fire near the hydrant.

Computer software has been used in the past as a way for inspecting authorities to track fire hydrant usage. These previous software approaches focus on collecting limited data on each fire hydrant and keeping the information local to the fire department or owner only. A typical fire hydrant management software program allows the user to input hydrant information, schedule maintenance, and create reminders for service. The local fire department can evaluate inputted data to determine water flow information and general location. These programs do not record data such as water quality, GPS location, or condition. Also they do not record requests for maintenance or improvements. None of previous approaches communicate with each other or communicate with a global registry. In fact, none of them communicate with other users who use the same program and therefore there is not a system that currently combines all of the gathered data for use by all fire departments. Commonly, because of high software costs and the lack of organization, departments do not use a formal hydrant management software program and instead rely on pencil, paper, calendars, and file cabinets.

A global registry currently does not exist for many owned asset areas and more specifically in the fire hydrant space resulting in a lack of global knowledge available when making widespread decisions regarding fire hydrants or a water system. The disadvantage of using current fire hydrant management software is the limitation of communication within the department and interdepartmentally. Commonly the person who inputs the data is not the one who uses the data, the software is limited to a specific computer, and the system of inputting and using data relies on the location and type of the specific computer. For example, the fire department personnel may inspect the fire hydrant and document required maintenance, but the hydrant maintenance crew (commonly water department personnel) does not have easy access to the software and cannot review or update required maintenance. Also, the maintenance crew does not have an easy way to communicate the status of a damaged hydrant to the fire marshal. There is not a software program that gives one department the ability to share their information with other departments either using the same software or using other software.

Currently there is not a standard format for collecting fire hydrant information. If there were a way to share a local database globally, the information would not likely integrate well using current software and inspection methods. Even if there were a way to integrate the different data types, third party groups like state fire marshals, insurance groups, and the general public would not have access to the data without the correct software. Therefore, the state fire marshal continues to be uninformed of the state's fire hydrant conditions, insurance groups have to give higher premiums because of their uncertainties, and the general public has less awareness of the water system and the crews that maintain it. The general public also has no communication with the fire department when trying to assess how they can volunteer their services in programs such as 'Adopt a hydrant' or 'Paint a hydrant'.

Further, current software fails to record all the available data upon an inspection. For instance, no currently available software allows input of results from a water quality test, a digital picture, GPS location, suggested maintenance, owner, or owner's address (as examples). Other approaches fail to generate reports summarizing an area's data such as manufacturer's reliability, flow availability, or departmental maintenance performance. Additionally, software programs are generally expensive and require their own maintenance. Adding licenses of the software to other computers can also be expensive. Many of the prior approaches fail to keep good fundamental records which affect the departments I.S.O. score and affects the local businesses and residence's fire insurance premiums.

Additionally, all previous approaches are tailored for input by a government agency such as a fire department or maintenance crew. This generally discourages the department from seeking independent (and unbiased) private companies to inspect and maintain fire hydrants. Allowing an accessible format to independent contractors would allow cheaper maintenance costs and saves the department and taxpayer's money.

SUMMARY OF THE INVENTION

A method for using a web registry to track the inspection compliance of an owned asset including notifying an owner of an asset that an inspection is needed to comply with a code. Electronically transmitting a list of at least one qualified inspector to a user. Receiving a completed inspection uploaded from an inspector. Transmitting the completed inspection to an approving authority. Completing a monetary transaction between the asset owner and the inspector when the inspection is approved by the approving authority.

A system for a web based compliance registry including a database configured to store owned asset information. A user interface in data communication with the database configured to show owned asset information on a display. A handheld device configured to wirelessly connect to the user interface and with the database in order to input and view owned asset data wirelessly and specific information based on its global position.

BRIEF DESCRIPTION OF THE DRAWINGS

The preferred and alternative embodiments of the present invention are described in detail below with reference to the following drawings.

FIGS. 7-17 show example screenshots of one embodiment of the web registry for inspection compliance used for fire hydrants.

DETAILED DESCRIPTION OF THE PREFERRED EMBODIMENT

Figure 1:
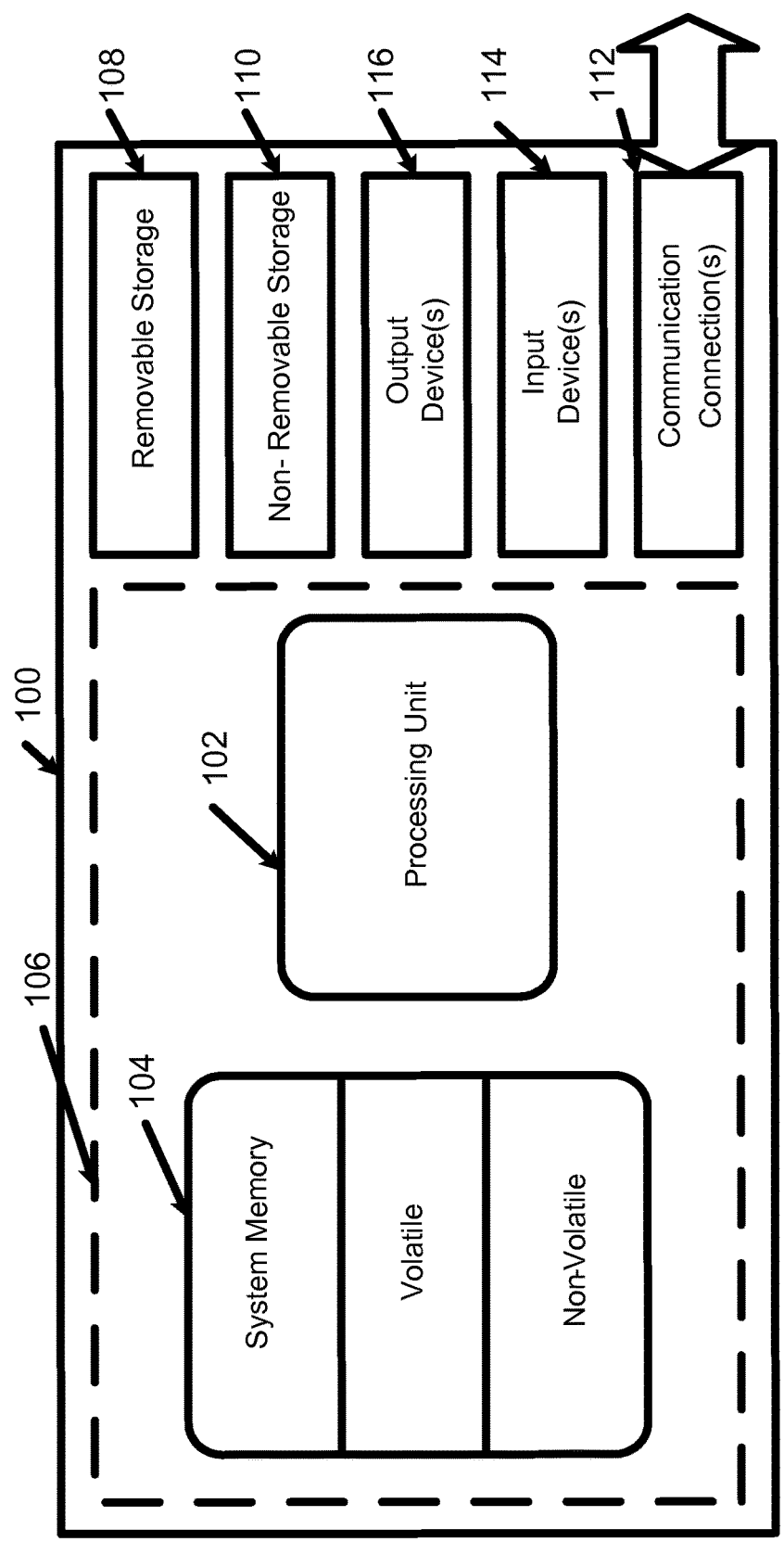
FIG. 1 illustrates an example of a computing system environment on which an embodiment of the invention may be implemented.

When trying to manage a registry of owned assets and more specifically fire hydrant inspections, there generally are multiple parties who are inputting data and using the data stored in the registry. There are a vast number of hydrants in a typical sized city and each preferably receives an annual inspection and some periodic maintenance. Without the inspections the fire hydrant may not be able to be properly used in case of an emergency. Further the hydrant may be leaking water or be otherwise unsafe. There are a number of groups that typically inspect hydrants and most do not communicate with each other. For example a private neighborhood association and the fire marshals do not communicate inspection results with each other. Once the inspection has been completed the information should be used by a firefighter when sent to a fire. In order to be a useful system, the firefighters should be able to see which, if any, of the hydrants in the area of the fire are available for use and properly functioning. Efficiently finding and activating a working hydrant in the area may be the difference in the survival of personnel and total destruction of the burning building.

Systems and methods for a web based registry compliance tool are described in further detail below. One embodiment of the invention comprises a series of steps to ensure that the inspection takes place and the inspection results are placed online in the web based registry. The series of steps advantageously take an owner of an asset from a notification that an inspection is needed, through bidding for an inspector, inspection, approval and payment and finally posting of the inspection in the registry. The registry further stores location information in order to allow a user with a global positioning system and access to the web based registry to review the status of all of the hydrants in the general area.

By way of an example in the fire sprinkler industry, national code requires annual inspections of fire sprinkler systems and related components (such as standpipes, fire department connections, fire pumps). In one embodiment, the fire marshal/building official will input information via the online registry regarding properties with fire sprinkler systems after initial inspection. A year later, the property owner will receive notice (via email, physical mail, or other) that the fire sprinkler system is due for annual inspection. The fire marshal will receive weekly or monthly updates of all due and overdue inspections. He/she will then use the registry to communicate to the owner his intention to enforce the inspection and the requirement for using the registry. The owner will use the registry to find qualified inspection companies and/or request bids from participating inspection companies. The registry will manage the bidding process and return the results to the owner for selection. The inspection company will use the registry to advertise their service and receive requests for bids and/or work. They will also use the registry (via the web or mobile device) to input their inspections with or without deficiency information which the registry sends to the fire marshal for review per the fire marshal's declared preferences. Depending on his preferences, he/she can review the inspection, verify city business license status of the inspection company, verify inspector qualifications, and approve, disapprove, or just confirm the inspection. He/she can also separately detail a course of action to an owner regarding any found deficiencies. The registry communicates the approval process between all parties until approval or confirmation is received. At that time the owner is notified the inspection is complete and approved and awaiting payment. The registry prepares an invoice for the inspection company to send to the fire sprinkler system owner. The owner receives the invoice and is able to pay online through the registry. Money is transferred to the inspection company, to the city (for any declared city/FM charges), and to any other necessary parties. The registry sends a message to the inspection company to confirm payment has been received. The inspection company verifies payment. The registry confirms that all transaction fees and fire marshal review fees are paid. If fees are not paid then the final submission will not be complete. The inspection is sent to the registry for final submission when payment is confirmed and the registry transaction fees and fire marshal review fees are paid. Until then the registry continues to notify the fire marshal that the inspection is due/incomplete.

FIG. 1 illustrates an example of a computing system environment 100 on which an embodiment of the invention may be implemented. The computing system environment 100, as illustrated, is an example of a suitable computing environment; however it is appreciated that other environments, systems, and devices may be used to implement various embodiments of the invention as described in more detail below.

Embodiments of the invention are operational with numerous other general-purpose or special purpose computing system environments or configurations. Examples of well-known computing systems, environments, and/or configurations that may be suitable for use with embodiments of the invention include, but are not limited to, personal computers, server computers, hand-held or laptop devices, multiprocessor systems, microprocessor-based systems, set-top boxes, programmable consumer electronics, network PCs, minicomputers, mainframe computers, distributed computing environments that include any of the above systems or devices, and the like.

Embodiments of the invention may be described in the general context of computer-executable instructions, such as program modules, being executed by a computer. Generally, program modules include routines, programs, objects, components, data structures, etc. that perform particular tasks or implement particular abstract data types. Embodiments of the invention may also be practiced in distributed-computing environments where tasks are performed by remote processing devices that are linked through a communications network. In a distributed computing environment, program modules may be located in both local and remote computer storage media including memory storage devices.

With reference to FIG. 1, an exemplary system for implementing an embodiment of the invention includes a computing device, such as computing device 100. The computing device 100 typically includes at least one processing unit 102 and memory 104.

Depending on the exact configuration and type of computing device, memory 104 may be volatile (such as random-access memory (RAM)), nonvolatile (such as read-only memory (ROM), flash memory, etc.) or some combination of the two. This most basic configuration is illustrated in FIG. 1 by dashed line 106.

Additionally, the device 100 may have additional features, aspects, and functionality. For example, the device 100 may include additional storage (removable and/or non-removable) which may take the form of, but is not limited to, magnetic or optical disks or tapes. Such additional storage is illustrated in FIG. 1 by removable storage 108 and non-removable storage 110. Computer storage media includes volatile and nonvolatile, removable and non-removable media implemented in any method or technology for storage of information such as computer-readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by device 100. Any such computer storage media may be part of device 100.

The device 100 may also contain a communications connection 112 that allows the device to communicate with other devices. The Communications connection 112 is an example of communication media. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, the communication media includes wired media such as a wired network or direct-wired connection, and wireless media such as acoustic, radio-frequency (RF), infrared and other wireless media. The term computer-readable media as used herein includes both storage media and communication media.

The device 100 may also have an input device 114 such as keyboard, mouse, pen, voice-input device, touch-input device, etc. Further, an output device 116 such as a display, speakers, printer, etc. may also be included. Additional input devices 114 and output devices 116 may be included depending on a desired functionality of the device 100.

Figure 2:
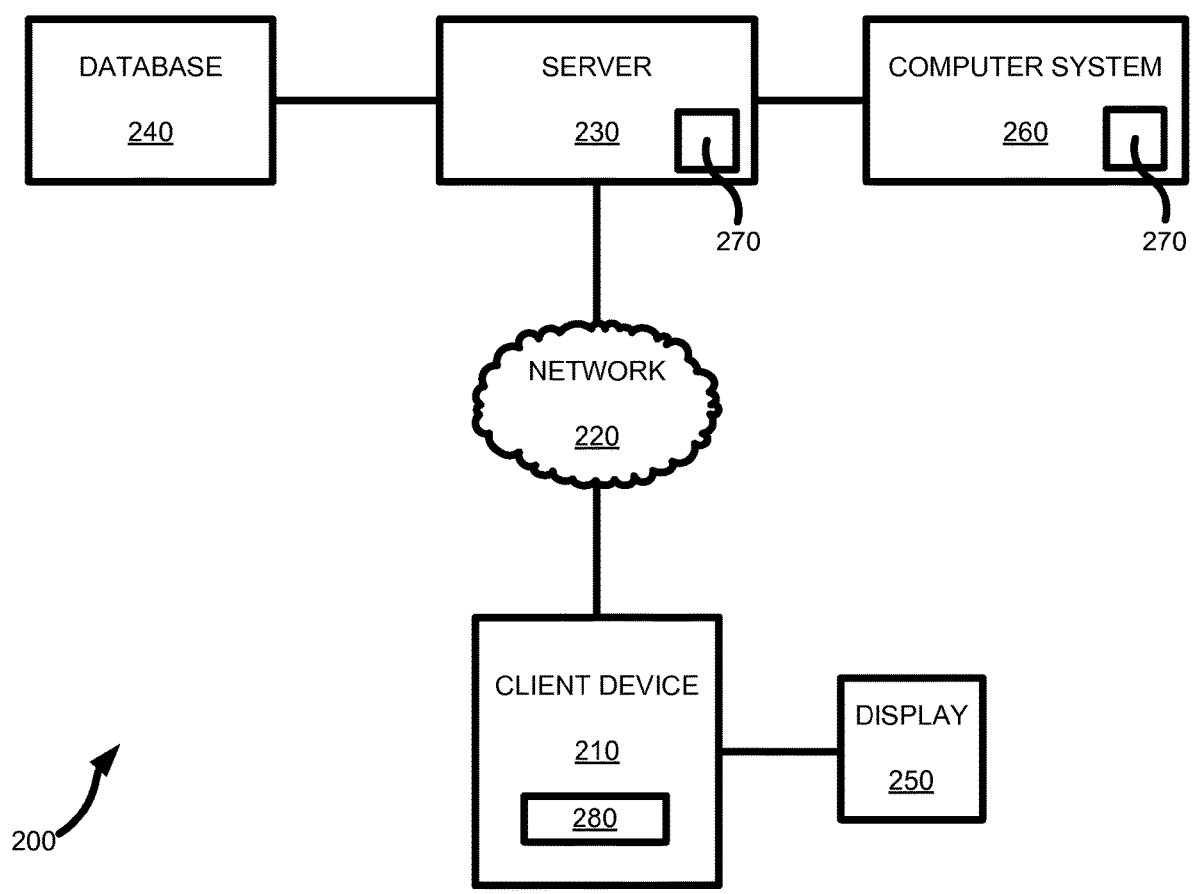
FIG. 2 illustrates an exemplary computer network system on which an embodiment of the present invention may be implemented.

Referring now to FIG. 2, an embodiment of the present invention takes the form of an exemplary computer network system 200. The system 200 includes an electronic client device 210, such as a personal computer or workstation, that is linked via a communication medium, such as a network 220 (e.g., the Internet), to an electronic device or system, such as a server 230. The server 230 may further be coupled, or otherwise have access, to a database 240 and a computer system 260. Although the embodiment illustrated in FIG. 2 includes one server 230 coupled to one client device 210 via the network 220, it should be recognized that embodiments of the invention may be implemented using one or more such client devices coupled to one or more such servers.

The client device 210 and the server 230 may include all or fewer than all of the features associated with the device 100 illustrated in and discussed with reference to FIG. 1. The client device 210 includes or is otherwise coupled to a computer screen or display 250. The client device 210 may be used for various purposes such as network- and local-computing processes.

The client device 210 is linked via the network 220 to server 230 so that computer programs, such as, for example, a browser, running on the client device 210 can cooperate in two-way communication with server 230. The server 230 may be coupled to database 240 to retrieve information there from and to store information thereto. Database 240 may include a plurality of different tables (not shown) that can be used by the server 230 to enable performance of various aspects of embodiments of the invention. Additionally, the server 230 may be coupled to the computer system 260 in a manner allowing the server to delegate certain processing functions to the computer system.

Still referring to FIG. 2, and in operation according to an embodiment of the invention, a user (not shown) of the client device 210 desiring to use a web based compliance registry on a browser application running on the client device to access web content served by the server 230.

Still referring to FIG. 2, and in operation according to an alternate embodiment of the invention, a user (not shown) of the client device 210 desiring to use a inspection web registry on a browser application running on the client device to access web content, which may, but need not, be served by the server 230. Specifically, by employing an appropriate uniform resource locator (URL) in a known manner, the user may run or download from the server 230 and install on the client device 210 a user interface module 280 comprising computer-executable instructions as described more fully hereinafter. Alternatively, the user may receive the module 280 on a tangible computer-readable medium (not shown), such as, for example, a CD-ROM, and subsequently install the module on the client device 210 from the medium.

Figure 3:
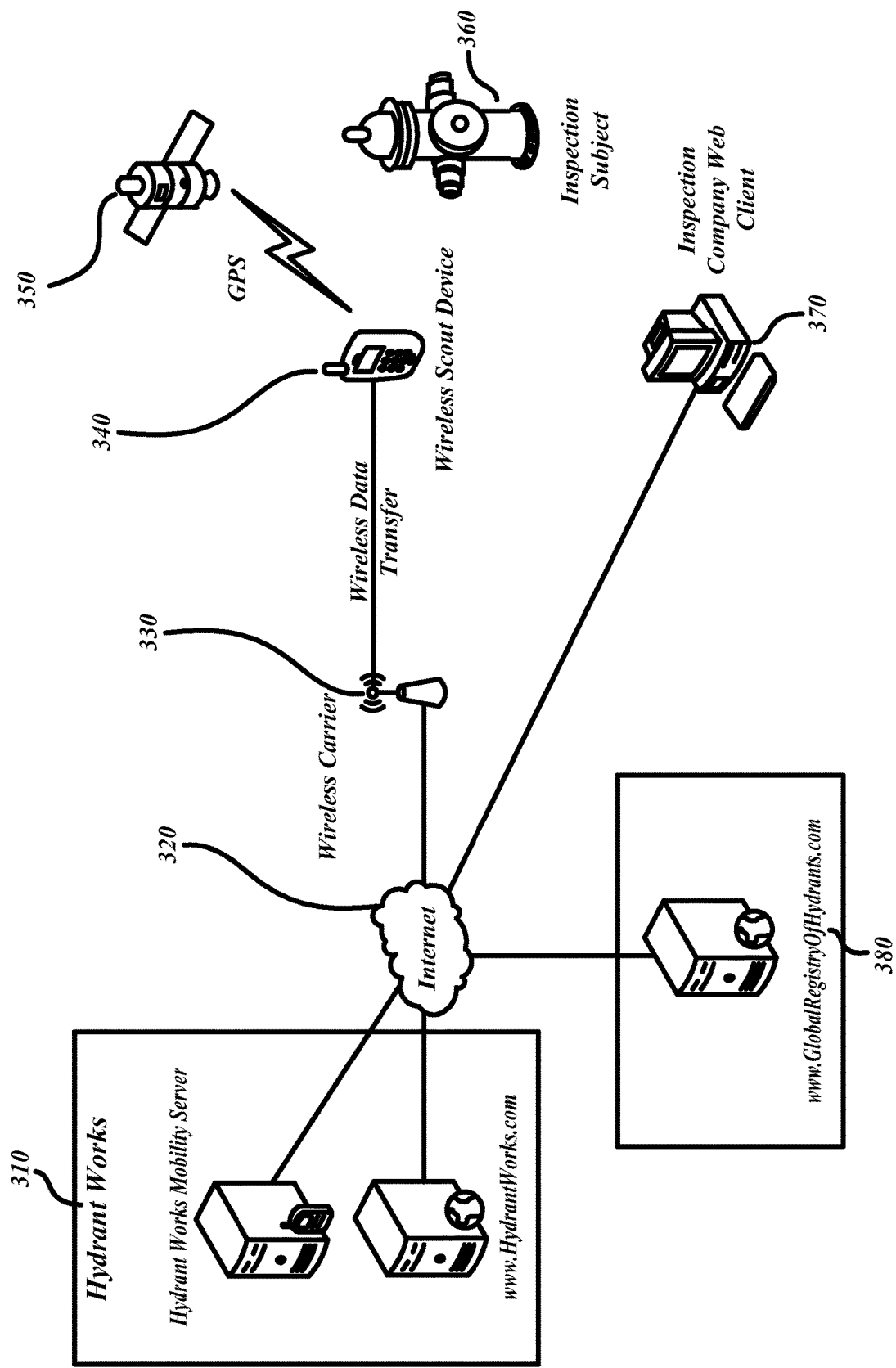
FIG. 3 shows an example system showing an web based compliance registry in one embodiment.

FIG. 3 shows an example system showing a web based compliance registry in one embodiment. The system includes a client device 370 connected to the internet 320 through a network or other internet connection. Once connected to the internet 320, the client device 370 accesses a web based compliance registry configured to show information on inspection compliance for an owned asset. In one embodiment, the owned asset is a fire hydrant inspection database. The web based compliance registry is shown to the user using a web interface. The web interface is linked to at least one database 380 containing web based compliance registry information. In one embodiment, the web enabled interface is connected to both a proprietary mobility server 310 and a global registry of hydrants database 380 in order to exchange information related to fire hydrants 360. Hydrant information is stored in the database 380 and using a search program allows users to manipulate or view hydrant data.

In one embodiment a handheld device 340 referred to as a scout device is included. The handheld device 340 is a handheld computing device, or system of a type known in the art, such as a handheld computer, wireless mobile telephone, personal digital assistant device, and the like. Handheld device 340 may comprise one of many well known handheld devices including, but not limited to a Palm Treo, a Blackberry or other handheld devices. Handheld device 340 comprises such software, hardware, and componentry as would occur to one of skill in the art, such as, for example, one or more microprocessors, memory systems, input/output devices, device controllers, wireless connectivity and the like. Handheld device 340 also comprises one or more data entry systems operable by a user of handheld device, such as, for example, a pointing device, keyboard, touch screen, microphone, voice recognition, and/or other data entry systems known in the art. Handheld device 340 further comprises a display system which may comprise many of the well known display devices such as liquid crystal diode displays, light emitting diode displays, etc., upon which information may be displayed in a manner perceptible to the user. Handheld device 340 may also comprise a data receiving system including, but not limited to a bar code reader, digital camera, GPS coordinates, Bluetooth, wireless connectivity, cellular connectivity, radio frequency identification software or an iris or fingerprint recognition system. The handheld device 340 having software to communicate with the web enabled interface wirelessly in order to update the hydrant registry. The handheld device 340 configured to update information about assets (including, but not limited to, a current location). The handheld device 340 further includes the following list of non exhaustive list of features: data is both manually and automatically inserted into the computer; coordinates from the GPS unit can be manually or automatically downloaded into the computer; pictures from the camera are automatically downloaded to the computer; the communication connection between the computer, the GPS unit, and the camera may be hardwired or wireless (such as Bluetooth) and/or a data entry program then utilizes the phone to upload (and download) data to the web based compliance registry.

In an alternate embodiment the system further includes the use of RFID chips to update information about assets (including, but not limited to, a current location). For example a hydrant would have an RFID chip and would transmit inspection data to a handheld device when the handheld device was within range.

Figure 4A:
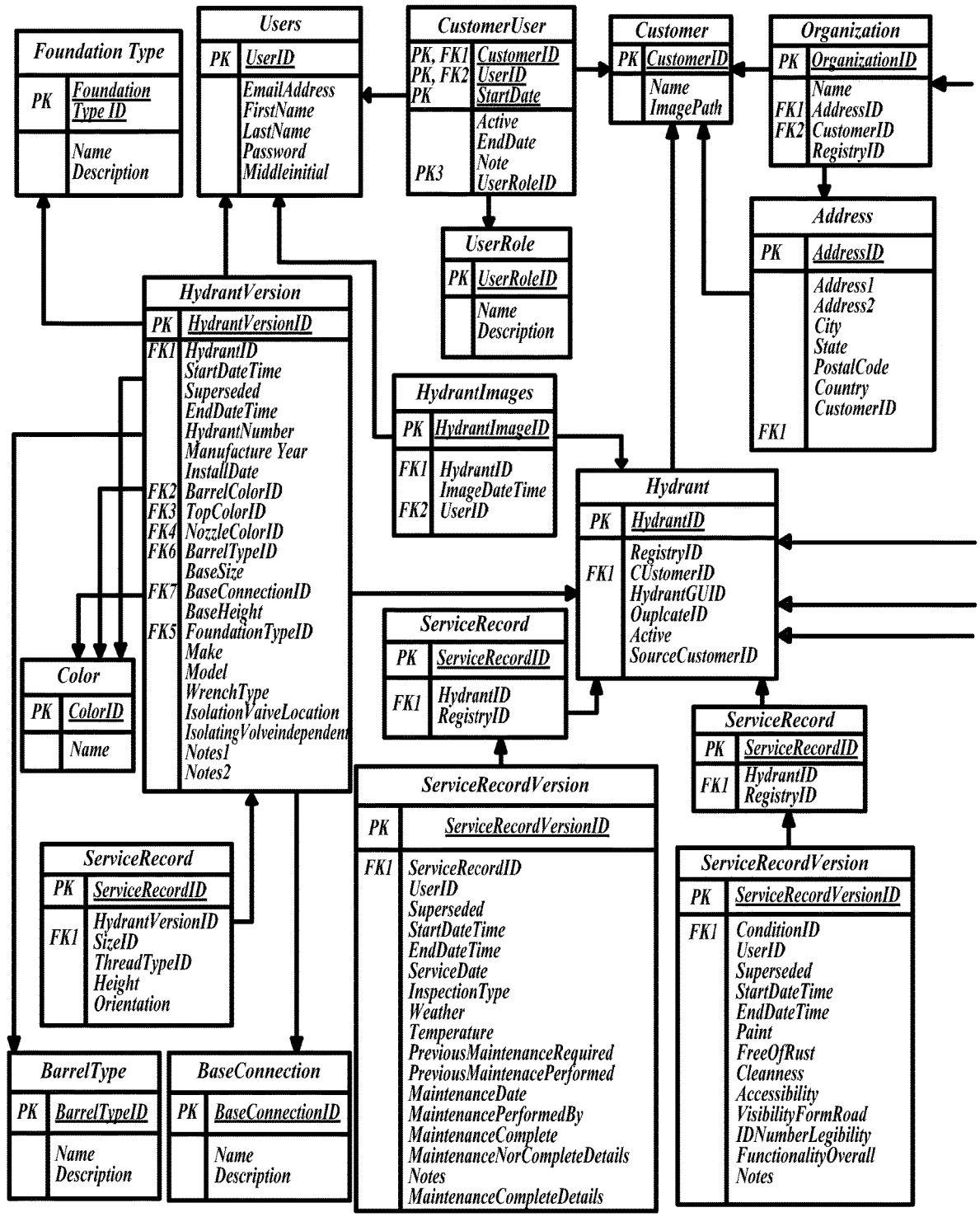
FIG. 4 shows a database relationship table in one embodiment for a web based registry for inspection compliance.
Figure 4B:
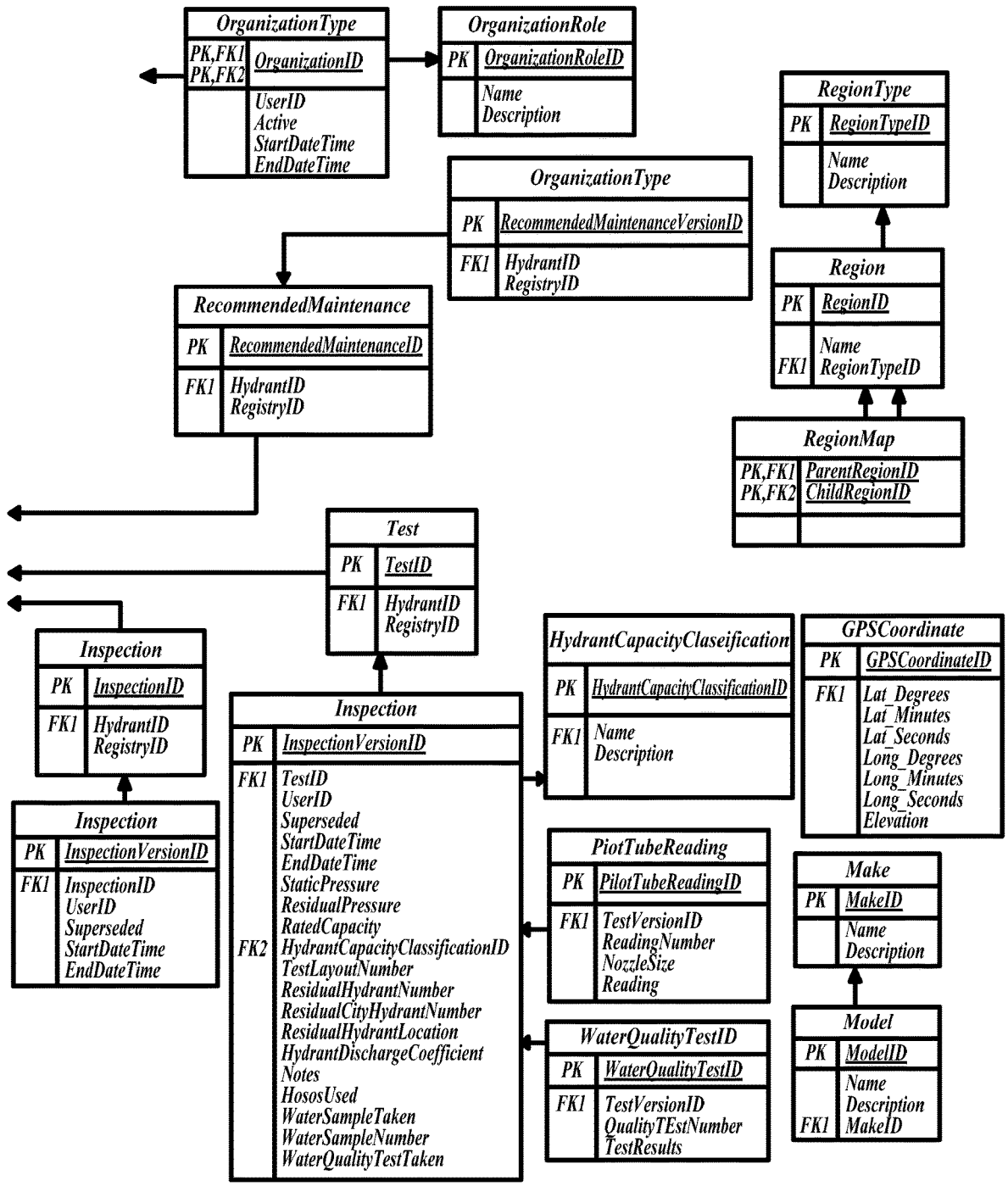

FIG. 4 shows a database relationship table in one embodiment for a web based registry for inspection compliance. Shown is a database configured to store information including but not limited to; hydrant ownership, make, model, year, color, condition, rating of needed maintenance (critical, important, light, or none), specific recommended maintenance, pressure, flow, GPS location, address, time of inspection, environment conditions during inspection, landscaping, digital picture of hydrant, nozzle size and orientation, physical description of hydrant, special markings, service record, water quality, and hydrant number.

Figure 5:
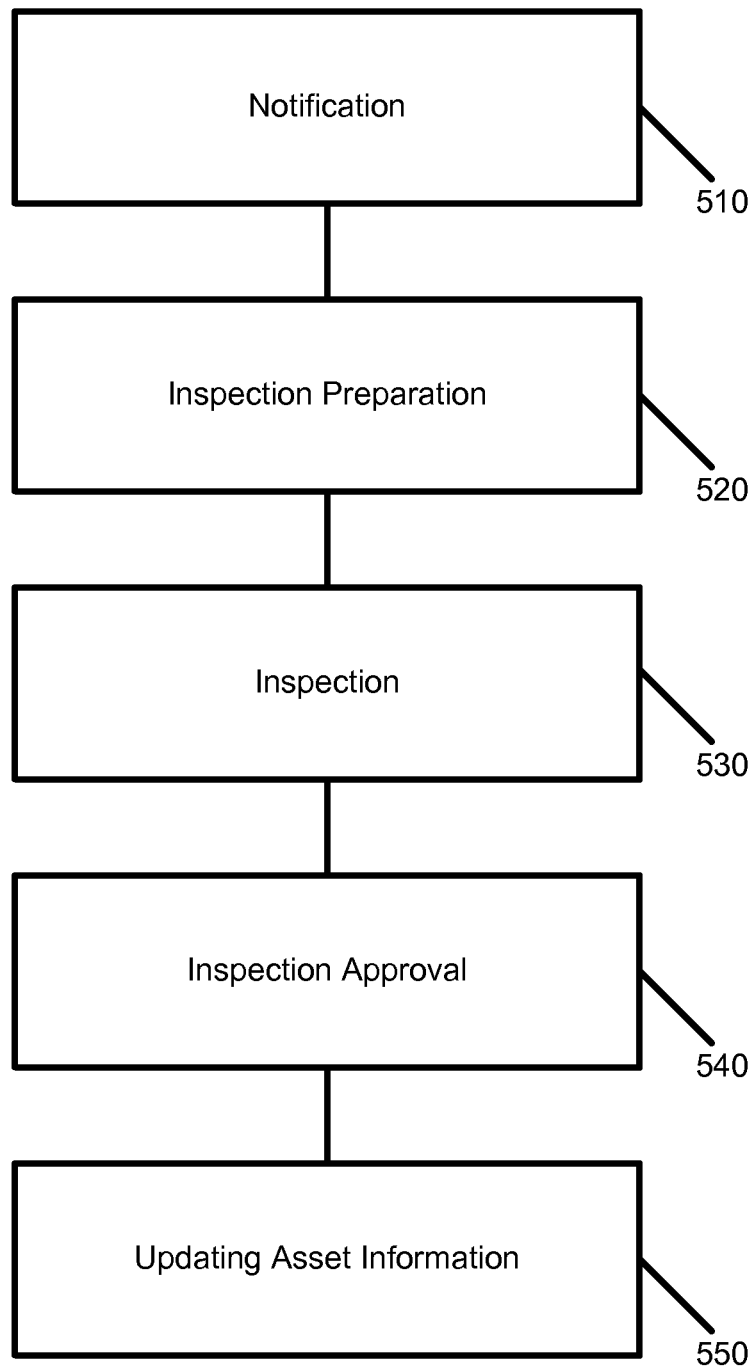
FIG. 5 shows a method for using a web enabled inspection registry.

FIG. 5 shows a method for using a web enabled inspection registry. At block 510 an owner/inspecting authority is notified that an inspection is needed on an owned asset. The notification is preferably generated based on an annual inspection. However in the case of an initial setup of the registry it also may be the initial request for information from an inspecting authority or it may include a request for further information from a concerned citizen. By way of example, the registry transmits notification to initially register with the registry and to perform an inspection and in the future notifies an owner when a subsequent inspection is necessary. Preferably the owner is sent recommendations on how the property is to be inspected, for example recommendations include names of inspectors, types of inspection needed and general costs associated with the inspection. The notification step is also used to alert the inspecting authority that an inspection is due. The inspecting authority is generally the organization in charge of ensuring compliance of the owned asset. For example a fire marshal is the inspecting authority for fire sprinkler systems. Generally, the inspecting authority receives information relating to all of the owned assets in their area of responsibility that are in need of an inspection.

At block 520 inspection preparation is done by both an owner of an asset and by an inspector. Once an owner receives notification he/she begins the inspection process by reviewing a list of inspectors and requesting bids for the job. The owner may select their own inspector or may use the web based compliance registry to find a qualified inspector or inspectors. In the registry a list of inspectors is available that includes licensed and bonded inspectors. Once a user has selected inspectors a bidding process is initiated in order to provide users with a list of prices for an inspection. The selection and bidding process is enabled using the web based registry interface. Through the user interface to the web based compliance registry a user is able to review the inspector and his/her credentials, review a bid for the inspection and finally select and schedule an inspection with one of the listed inspectors.

At block 530 an inspection takes place. The chosen inspector inspects the owned asset based on standard industry inspection rules and regulations. In order to perform the inspection, the inspector either carries with him/her an inspection sheet that includes an area to enter in all information required by an embodiment of the web based inspection registry or uses a handheld device to perform the inspection. Generally, if an inspector uses the pen and paper means for an inspection the inspector or the asset owner will update the registry manually using the data recorded on site. In another embodiment the inspector uses a web enabled handheld device configured to interface wirelessly with the internet or directly with the registry database. The inspector uses the device to enter in the inspection information and advantageously can print or transmit the inspection to a reviewing authority from the web based compliance registry.

At block 540, the inspection, after being loaded into the registry, goes through a review period. The review is conducted by the approving authority and is done to ensure the inspection is completed in compliance within the rules and regulations of the inspection. This allows the approving authority the ability to quickly review each inspection and provide feedback to the inspector at the earliest convenience. Once the reviewing authority has approved the inspection. The registry sends an invoice to the asset owner in order to arrange for payment. The registry allows for the owner to pay online and then sends payment to the inspector therefore completing the transaction. By way of an example once an inspection is complete previously submitted credit card information is billed for the inspection which preferably includes the inspector's fee, the fees for filing an inspection with the approving authority and registry fees. Deficiencies noted then the authority is able to contact owner and provides coa's At block 550, the inspection is complete and the information is updated on the system to reflect a completed and valid inspection. Once updated the information is advantageously viewable by all interested parties.

Figure 6:
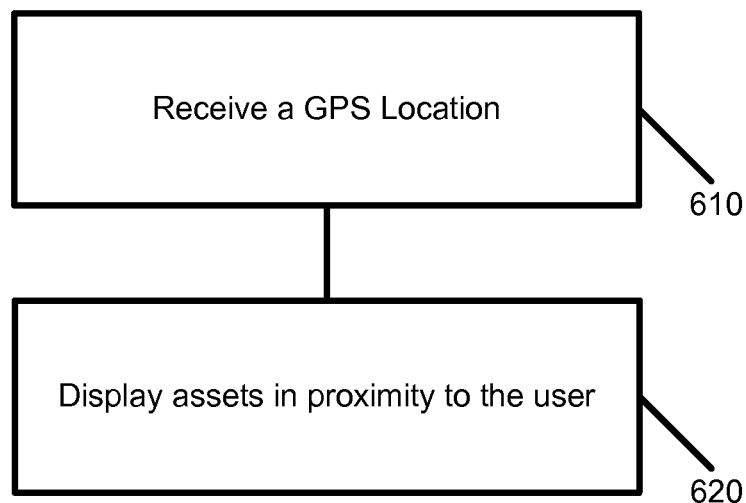
FIG. 6 shows a method of using the registry in one embodiment.

FIG. 6 shows a method of using the registry in one embodiment. A user may carry a wireless handheld device to input data as discussed above, but also the handheld device may be used to display inspection status and details of the assets in the user's proximity. At block 610, the unit receives a global positioning system location and with that information at block 620 displays the assets in proximity to the user. The user may use this display to inspect the assets or send reminders to the owners that there asset still needs to be inspected and view asset details. In one embodiment the handheld device may be used by firefighters as they are responding to jobs to see the most recently inspected and approved hydrants and hydrant details in there vicinity.

Figure 7:
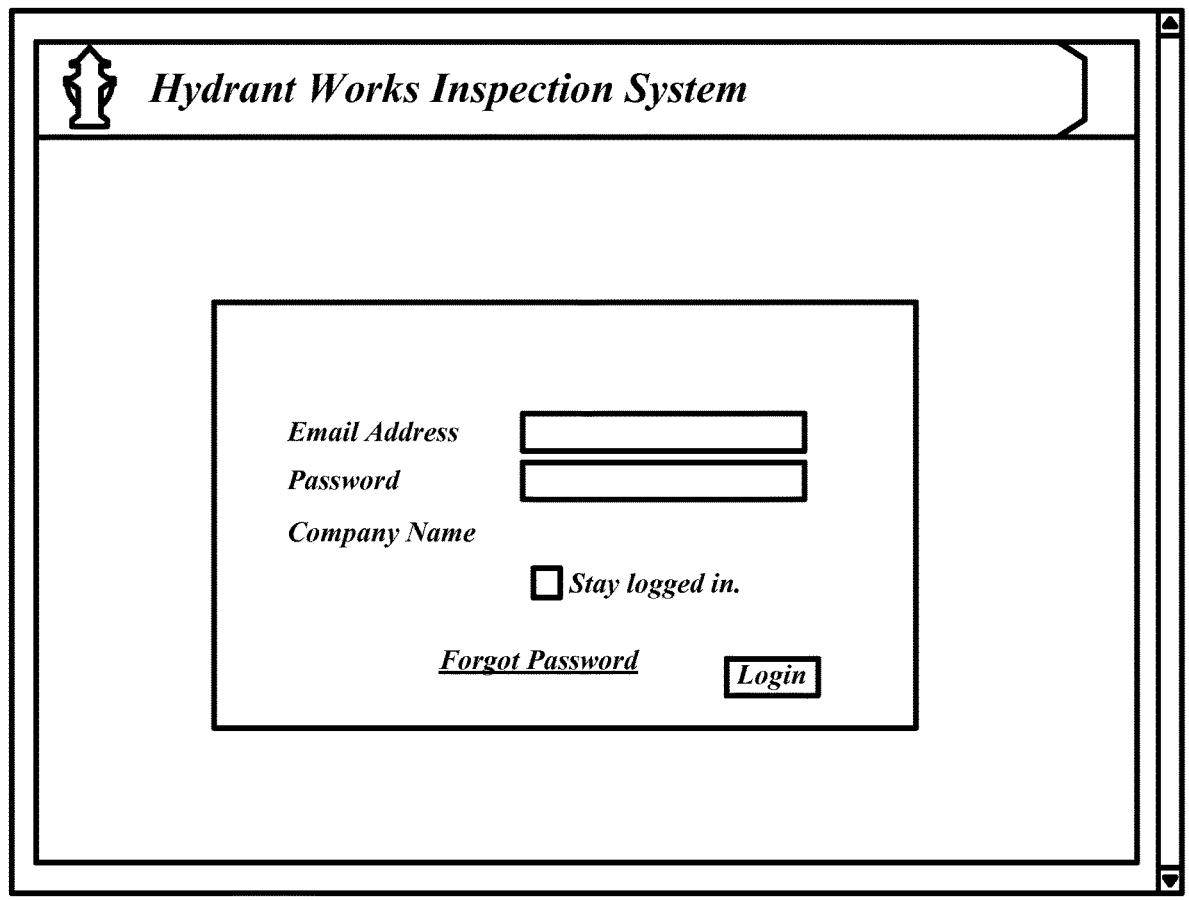
Figure 10:
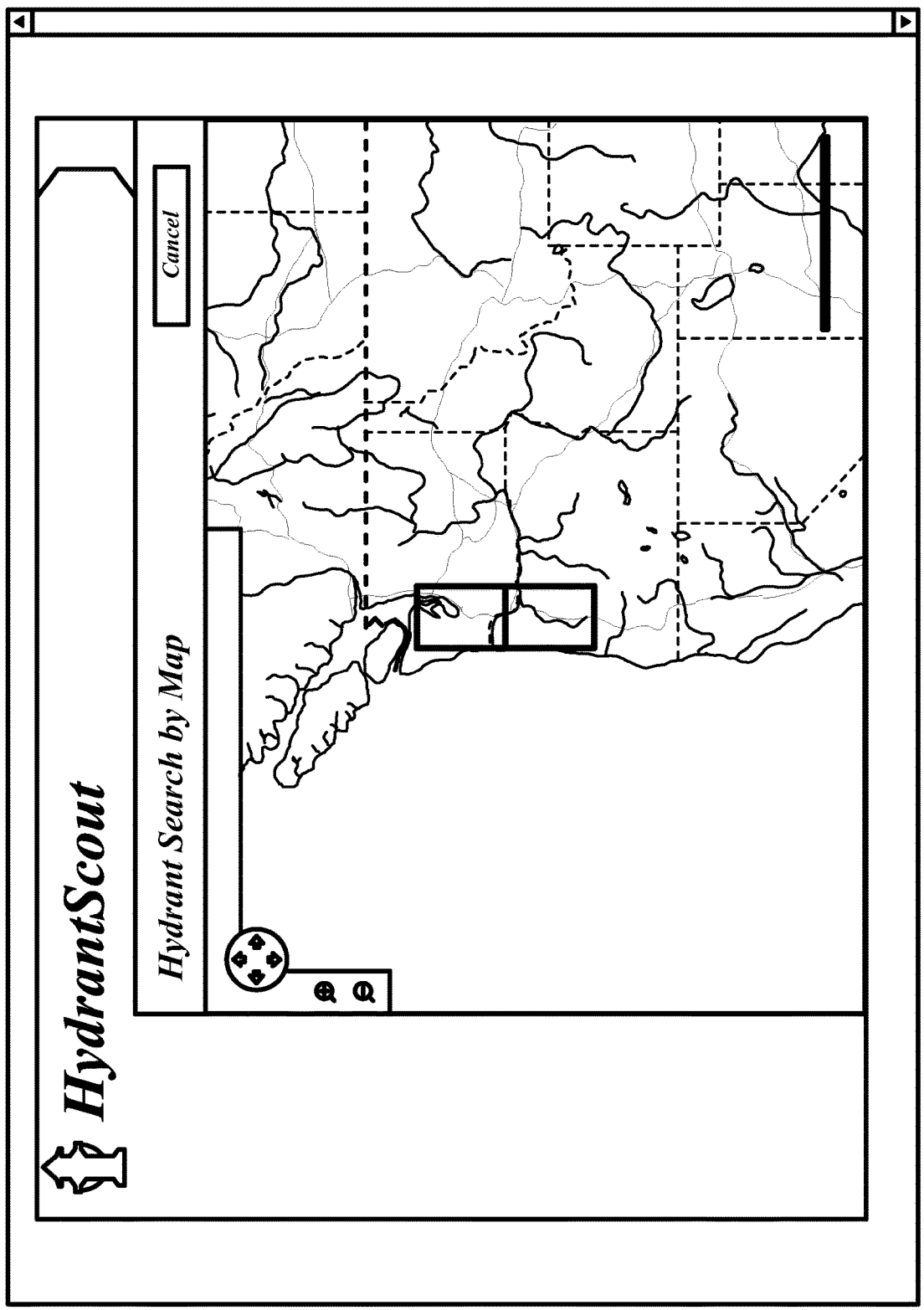
Figure 12:
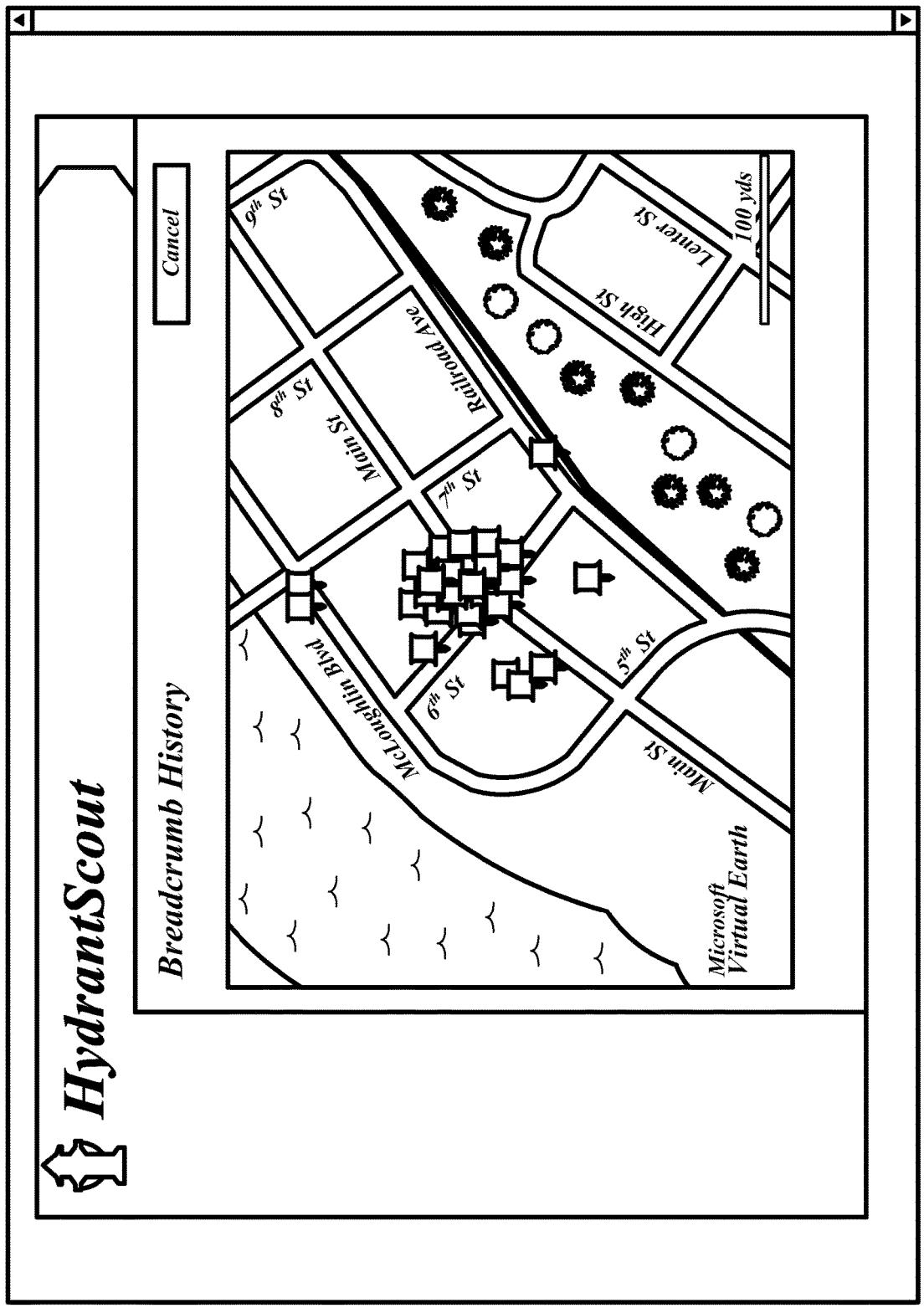
Figure 14:
Figure 15:
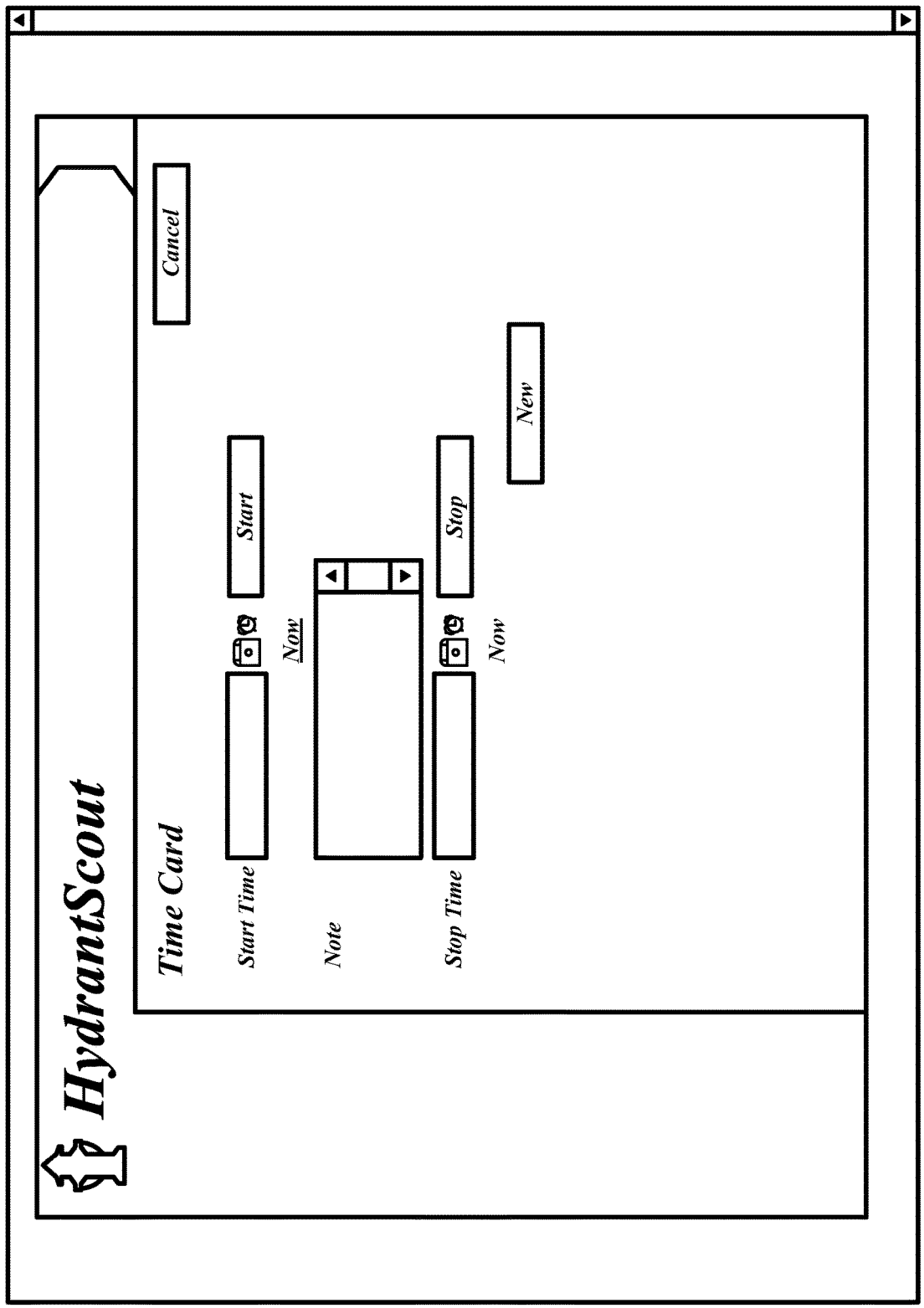
Figure 16:
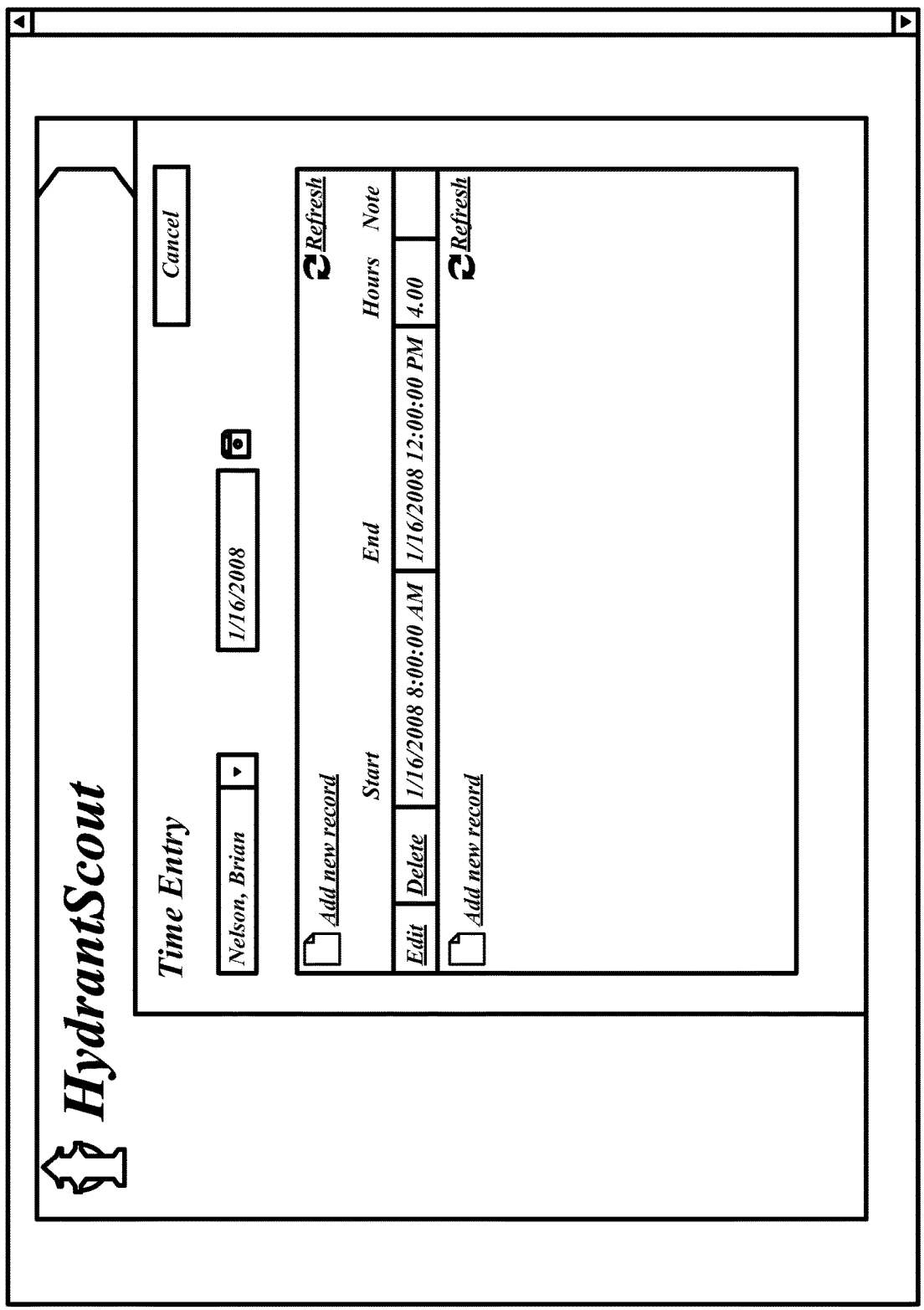
Figure 17:
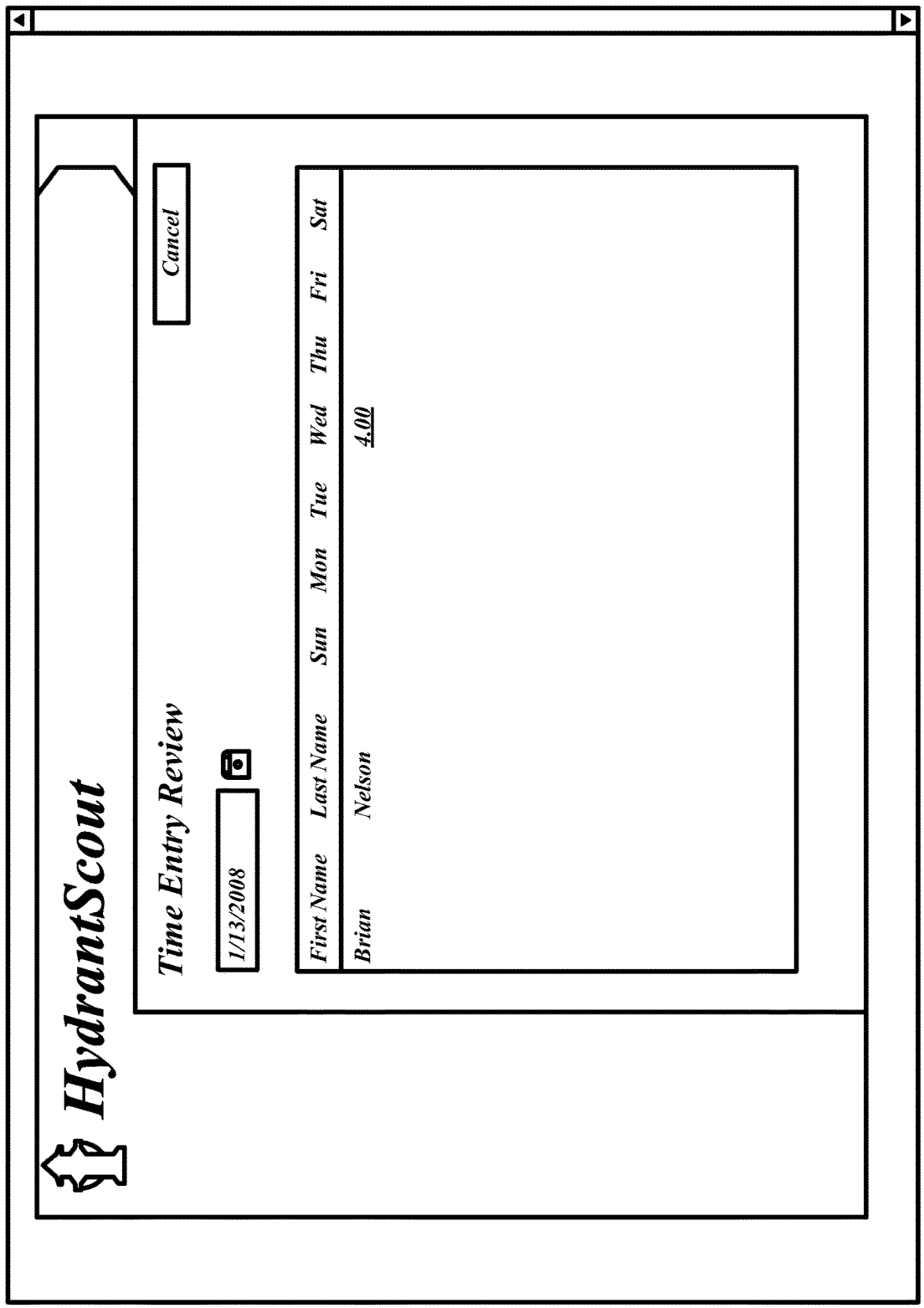

FIGS. 7-17 show example screenshots of one embodiment of the web registry for inspection compliance used for fire hydrants. FIG. 7 shows a login screen in one embodiment. The user will have preferences and permissions based on whether they are an owner, inspector or an authority. FIG. 8 shows a create hydrant screen which allows a user to add information about a hydrant. FIG. 9 shows a hydrant search screen which allows a user to see the results of a typical hydrant search along with identification information about the hydrants. Included in the results screen are pictures of the hydrants if available as well as other identification information such as address and type. FIG. 10 shows a hydrant search using a map. On this screen a user uses an interactive map to find a location. Once the location is selected a graphical representation of the hydrants in the area is shown to the user. FIG. 11 shows a view of the hydrant details accessible from the hydrant search page shown in FIGS. 9 and 10. FIG. 12 shows a graphical representation of hydrants in an area on a map as selected by a user. FIG. 13 shows a screen that allows a user to customize the screen views of the program described in one embodiment. FIG. 14 shows a user management screen in which an administrator can set users and change permissions of those users. FIGS. 15-17 show time card entry screens in which a user or an inspector records time spent on inspecting a hydrant for a future payment in one embodiment.

Figure 18:
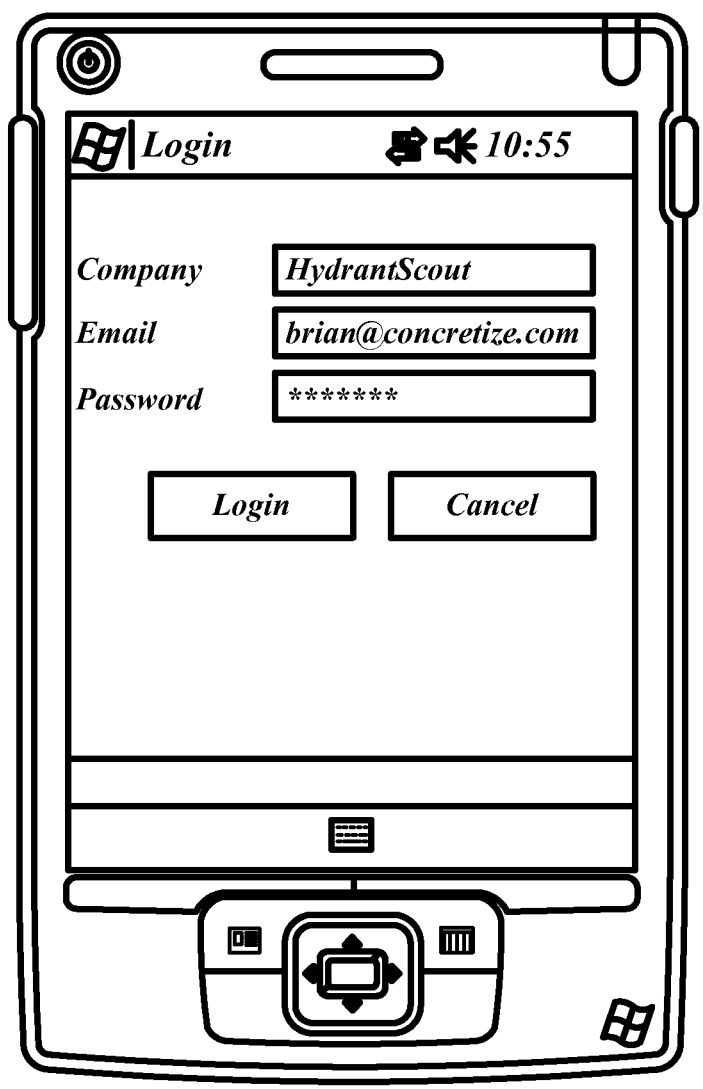
FIGS. 18-23 shows screenshots of one embodiment of the web registry for inspection compliance used for fire hydrants and accessed from a mobile device.
Figure 19:
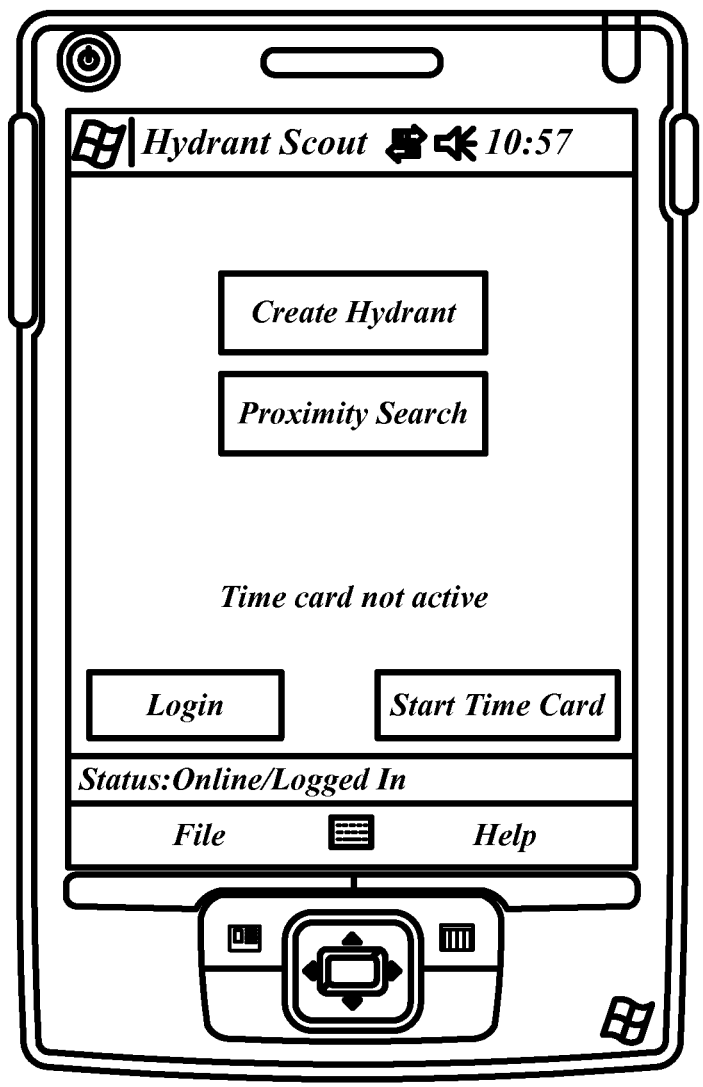
Figure 20:
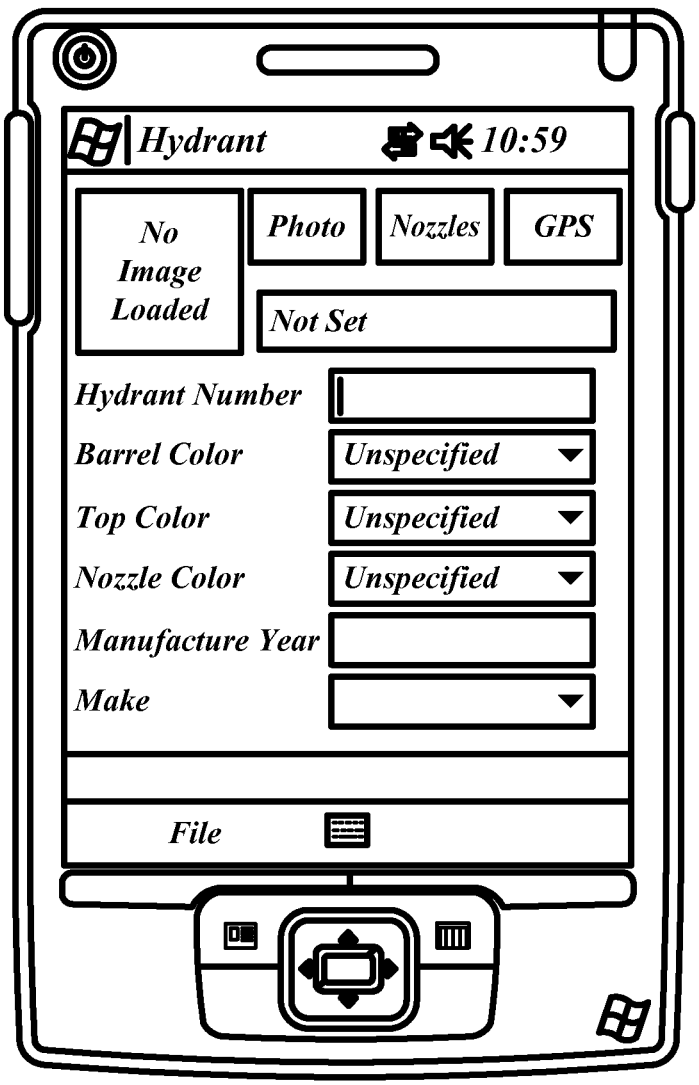
Figure 21:
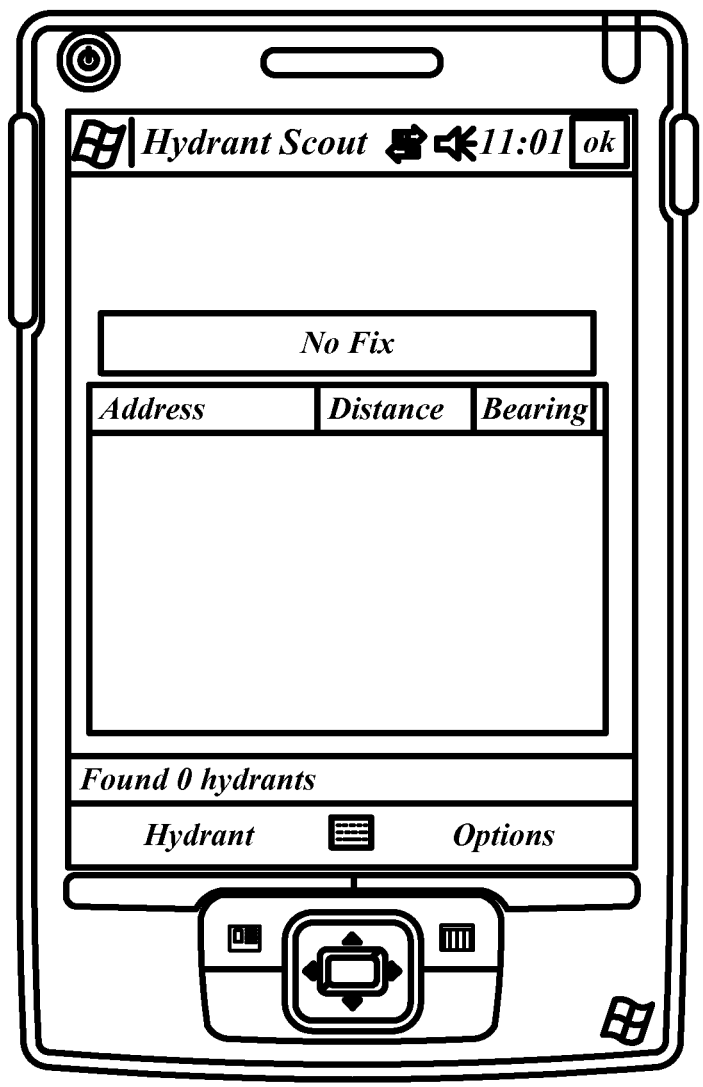
Figure 22:
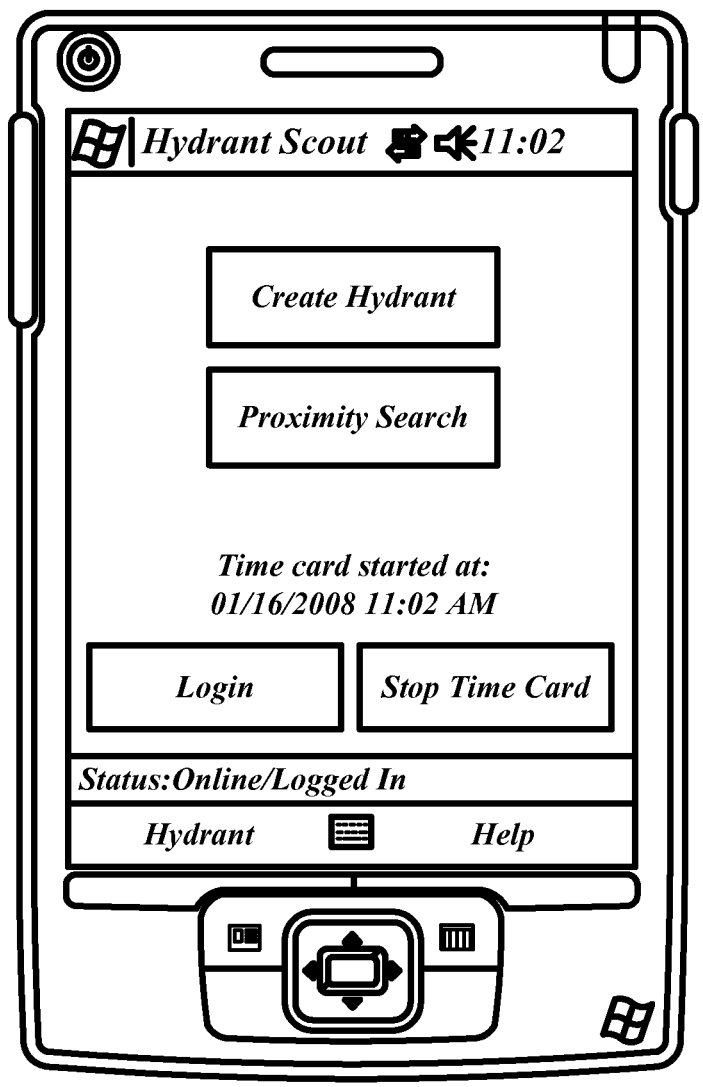
Figure 23:
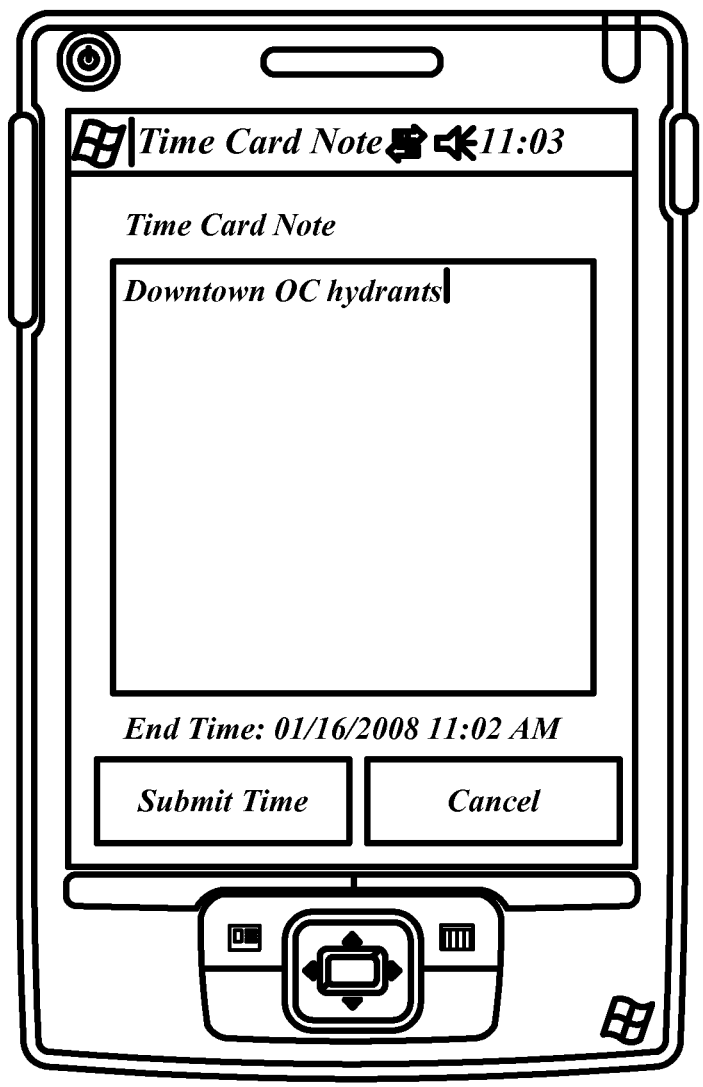

FIGS. 18-23 shows screenshots of one embodiment of the web registry for inspection compliance used for fire hydrants and accessed from a mobile device. FIG. 18 shows a login screen used on a mobile device. FIG. 19 shows the home screen for the handheld device, allowing a user to create a hydrant, search for hydrants in proximity to the handheld device, login/logout and start a time card. FIG. 20 shows a create hydrant screen which allows a user to add information about a hydrant. FIG. 21 shows a proximity search screen displaying information about hydrants in proximity to the device. FIG. 22 shows the home screen with the time for the time card started. FIG. 23 shows a screen allowing a user to enter notes about their time entrees on the handheld device.

The global registry is intended to assist the government, private owners, insurance bureaus, businesses, and the general public in providing information regarding hydrant condition, location, and water quality. The most important purpose is to prepare the fire department for the hydrant and water conditions prior to arriving at a fire incident. This preparation will improve the approach of extinguishing a fire by showing the best hydrant for the fire department to connect to and also give visual reference of that hydrant prior to arriving at the site. This improvement will allow a fire department to put more water on a fire quicker and save lives and property. Non-working or low performing hydrants will be identified prior to arriving at the site and avoided. Another major purpose of the registry is to assist maintenance crews in locating and preparing work on hydrants in need of service. Equally important, these needed and/or finished repairs are communicated back to the fire marshal and fire department. This vital communication will inform the fire fighters of hydrant conditions. The state fire marshals are able to review the performance of local fire marshals and maintenance crews. The improved method of record keeping hydrant information will improve a city's ISO (insurance) rating which will save money in fire insurance premiums for local businesses and homes. The web based compliance registry is optionally advantageous to improve the process of inspections and in many cases introduce a new ability to enforce inspections. The authorities will be able to easily monitor, require, enforce, review, approve, and summarize all the inspections under their control. This new method will provide an easier way for them to charge for their review time and a way to confirm inspection companies are licensed to work in their city. This will help the cities recuperate lost expenses previously overlooked or ignored.

Multiple embodiments may be advantageously used by the following non exhaustive list of users. Budgeting committees will use the registry to more accurately predict annual maintenance and repair costs. Private hydrant owners will register their hydrants in the global registry which will notify the owner when inspection and testing is required. Fire hydrant maintenance crews will use this registry to schedule and prepare necessary maintenance at specific fire hydrants. An inspection crew will use the registry to record all findings regarding a fire hydrant test and inspection. The fire department will use the registry when preparing for a fire by researching the hydrant condition, the GPS location, the GIS map, and the digital picture for a visual confirmation prior to arriving at the site. The local fire marshals will use the registry to verify progress of the maintenance crews. State fire marshals will use the registry to review the status of fire hydrants in a specified area (statewide, citywide, or other). Insurance companies and rating bureaus will use the registry to assist them in accurately grading a state, city, district, business, neighborhood, or house based on the conditions and location of hydrants. The Environmental Protection Agency (EPA) and the general public will use the registry to verify a state's or city's compliance with the Safe Water Drinking Act and general information about the water quality. City engineers and planning and development agencies will have multiple uses for the registry. Hydrant manufacturers would use the registry to determine the performance of their products and at the same time, relate it to competitor's products. Consumers will use the registry to determine more reliable products based on a specific make and models past performance. Installation, testing, inspection, service, repair, and material supply companies will register with the global registry which will allow them to receive orders or bid requests for their service or material. The general public will use the registry to verify the quality of public fire hydrants. Civil Engineers and Surveyors would use the fire hydrant GIS maps and GPS locations in the registry as survey points during planning and development. Financial officers will use the registry to determine current infrastructure assets for accrual accounting practices in accordance with GASB-34.

In alternate, yet related embodiment a Closed System Fire Hydrant Water Flow Test is disclosed as a means for inspecting fire hydrants while maximizing environmental protection. Specifically, it is the protection of the environment from water damage caused by flowing fire hydrants. The system further controls drainage during and after a fire hydrant flow test or flushing. Other fields affected by the system include, but are not limited to, water conservation, landscape protection, water main flushing, water quality testing, and hydrant maintenance and testing. Generally the following groups will advantageously benefit from this invention are private hydrant owners, general public, fire departments, water departments, water companies, hydrant testing and maintenance companies, and the Environmental Protection Agency (EPA). The close system fire hydrant water flow test system, in one embodiment, further includes a fire hydrant in-line electromagnetic flow meter.

Hydrant inspection and testing companies advantageously can improve the quality of their testing and obtain more consistent results. Companies and jurisdictions responsible for testing hydrants will be able to provide a safer test for the environment and immediate landscaping. This product will decrease the amount of flow time on a hydrant allowing the testing party to test more hydrants per day. A closed system test will allow testing parties to safely and quickly test hydrants located in high traffic areas such as downtown or on highways, which was previously unpractical to do because the danger of expelling thousands of gallons of water over roads with high traffic. Some hydrants are located in areas with protected landscaping or environmentally protected areas. Testing parties will now be able to test these hydrants without impact to the environment. Testers will also be able to control drainage of water collected by these tests into areas that are capable of supporting the necessary water flow. Other applications include testing fire pumps, water pumps, water tanks, or any other water source. In addition, the product could be used to test other liquids. Other applications for the Closed System Fire Hydrant Water Flow Test advantageously applied when water reservoirs are low, such as during drought seasons; and the system may be further adapted for performing water quality testing, obtaining GPS surveying information, and conveying the GPS surveying information to data storage mediums, for example a personal computer database or PDA device, in the form of text, pictures, and GPS data. Application of testing and flushing fire hydrants to a tank will allow testing/flushing companies to preserve water, landscaping, and environment while servicing. Additional commercial applications include the rental or sale of such systems that would allow owners, private contractors, government agencies, etc to test fire hydrants. The system would preferably include a pipe or hose connected to a flow meter device connected by pipe or hose to a control valve connected by pipe or hose to a tank (such as a water tank truck, or tank trailer). The tank would be connected by pipe or hose to a drain valve in order to discharge the water into a safe area.

The Closed System preferably includes all, at least one or a plurality of the following non exclusive list of features: a water passage device such as hose or pipe connected to a water control valve and an in-line flow meter connected to a tank for collecting the water. The tank is further connected to a water control drain valve which may be connected to hose or pipe. The closed system further includes: a shut-off valve, a 'through' flow meter (such as an electromagnetic flow meter), and a tank (such as a water truck). The tank gauges and manages the amount of water so as to assure proper flow test results such as a tank level alarm, and/or an overflow outlet, and a drain valve.

In one embodiment a method for using a closed system include: connecting to a water source such as fire hydrant, closing the shut-off valve within the closed system, opening the fire hydrant gate valve allowing water to enter the closed system up to the closed shut-off valve, quickly opening the shut-off valve in the closed system, recording a reading from the electromagnetic flow meter, closing the shut-off valve in the closed system, closing the fire hydrant shut-off valve and removing the connection to the closed system.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiment of the invention in which an exclusive property or privilege is claimed are defined as follows:

1. A computer-implemented method for using a fire hydrant management software system accessible via a web registry to track a requisite inspection of an owned asset comprising:

granting remote access, by a computer-based system, to the web-based registry, wherein the web registry is managed by fire hydrant management software, to at least three classes of user, wherein the three classes of user comprise:
        (1) an owner of an asset
        (2) an approval authority
        (3) an inspector;
    retrieving, by a computer-based fire hydrant management software system, real time records of assets from a database, the database being remotely accessible and augmentable by each of the at least three classes of user;
    analyzing the records of assets from the database to determine whether an asset requires inspection;
    automatically creating, according to computer-executable instructions of the fire hydrant management software, standard format inspection list, based upon the analysis of records of assets from the database, wherein the standard form inspection list includes each asset due for inspection and each asset within a designatable interval of being due for inspection;
    for each asset on the inspection list, according to computer-enabled instructions of the fire hydrant management software, retrieving a list of qualified inspectors according to designatable attributes including proximity to the asset, wherein an inspector, upon accessing the web registry, can review and update information, including location;

for each asset on the inspection list, generating a standard format notice notifying the approval authority of the status of the assets assigned to the approval authority, and wherein the approval authority, upon accessing the compliance registry, may update and review the status of the assets;

for each asset on the inspection list, generating, according to computer-executable instructions of the fire hydrant management software, a standard format notice notifying an owner of the asset of an impending deadline for the inspection such notice to include the list of qualified inspectors for the asset, a description of the type of inspection, and a cost associated with the type of inspection, and wherein the owner of the asset, upon accessing the web-based registry, may update and review the status of the assets assigned to the owner;

receiving, by a computer-based system, at a server through an internet portal, the server in communication with the web-based registry, information that one of the qualified inspectors supplies, the information garnered by performing the required inspection;

retrieving, by a computer-based fire hydrant management software system, a standard format report template configured to the asset, compiling a report based upon the information the inspector supplies;

transmitting, by a computer-based system, the completed inspection report, based on the report template and the information garnered by performing the inspection, to the approving authority;

transmitting, from the approving authority, by the web-based registry, a standard format notice to the owner of the asset, the notice to include a report of the received information and where the received information includes a noted deficiency;

automatically, according to computer-executable instructions of the fire hydrant software, augmenting at the database, the records relative to the asset to reflect the information the inspector supplies when the inspection is approved by the approving authority; and after the inspection is approved by the approving authority, completing a monetary transaction between the asset owner and the inspector.

2. The method of claim 1 further comprising:
at a computer in network communication with the database, entering initial information about a non-included asset that requires periodic inspection to comply with a code.

3. The method of claim 1 further comprising:
for each asset on the inspection list, transmitting to each qualified inspector on the list of qualified inspectors relative to the asset information about the asset sufficient for the qualified inspectors to generate a bid to inspect the asset;
receiving bids for a contract to inspect the asset from at least one of the qualified inspectors relative to the asset;
transmitting the received bids of the asset;
receiving a selection of a bid from the owner of the asset from among the received bids; and
transmitting to the qualified inspector who submitted the received selection, an acceptance of the bid.

4. The method of claim 1, wherein the asset is a fire hydrant, and further wherein the report of the received information includes a water quality test and a course of action based upon the received information, the course of action to include remedy of the deficiency.

5. A computer-implemented method for using a web registry to track an asset owner's inspection compliance, the computer-implemented method comprising:
granting remote access to a compliance fire hydrant management software registry system hosted on a server and accessible through a web-portal to at least three classes of user, wherein the three classes of user comprise:
  (1) an owner of an asset
  (2) an approval authority
  (3) an inspector;
at a database, in communication with the compliance fire hydrant management software registry system, including records of assets, compiling an inspection list to include those assets which, after expiration of a designatable interval, will require an inspection;
generating with respect to at least one asset, a list of the qualified inspectors that are available to inspect the asset based upon attributes including proximity to the asset;
generating with respect to at least one asset, a standard form notice notifying the approval authority of the status of the asset assigned to the approval authority, and wherein, the approval authority, upon accessing the compliance fire hydrant management software registry system, may update and review the status of the assets;
transmitting, by the fire hydrant management software in communication with the web registry, a standard form notification to an owner of the at least one asset on the inspection list, including the list of qualified inspectors a description of the type of inspection, and a cost associated with the type of inspection, indicating that the asset requires an inspection, and wherein the owner of the asset, upon accessing the compliance fire hydrant management software registry system, may update and review the status of the assets;
displaying, at the web portal associated with the compliance fire hydrant management software registry system, attributes of the at least one asset, to at least one of the qualified inspectors from the list of qualified inspectors relative to the asset, the attributes selected to enable the at least one of the qualified inspectors to formulate a bid for a contract to inspect the asset;
receiving at the web portal associated with the compliance fire hydrant management software registry system, a bid from the at least one inspector from a list of qualified inspectors;
displaying to the owner the bid from the at least one inspector for selection;
receiving, at the web portal associated with the compliance fire hydrant management software registry system, the selection of a bid from the owner, such selection to include a form of payment for the inspection;
notifying the at least one inspector of a standard format contract to inspect based upon the selected bid;
receiving, at the web portal associated with the compliance registry system, from the at least one inspector, according to an asset specific template provided by the compliance registry system, standard format inspection information indicating the status of the asset, wherein the received inspection information includes receiving information describing deficiencies in the asset job, the owner of an asset receiving bids from qualified inspectors based on the needs of the asset;

after receiving the inspection information, notifying the approval authority of the inspection information;

receiving approval from the approval authority;

transmitting a standard format notification that an inspection was completed and approved by an approving authority; and releasing to the inspector the payment.

6. The method of claim 5 further comprising:

populating the database with initial information about an asset that requires periodic inspection to comply with a code.

7. The method of claim 5, wherein the receiving inspection information, further comprises:

collecting inspection information using a handheld device.

8. A computer-implemented method for using a fire hydrant management software and a web-based registry to track requisite inspection of an owned asset comprising:

granting remote access to a web-based registry system, wherein the web-based registry is configured to run a fire hydrant management software, to at least three classes of user, wherein the three classes of user comprise:

(1) an owner of an asset (2) an approval authority (3) an inspector retrieving, by a computer-based fire hydrant management software system, real time records of assets from a database, the database being accessible and augmentable by a classes of user;

analyzing the records of assets from the database to identify notification events;

based on the analysis, notifying an owner of an asset of a notification event, wherein the notice includes a standard format description of the type of inspection, and a cost associated with the type of inspection, and wherein the notification event comprises a designatable interval in advance of an impending deadline for the inspection, and wherein the owner of the asset, upon remotely accessing the fire hydrant management software compliance registry, may update and review the status of the assets;

based upon the analysis, sending a standard format notice to the approval authority of the status of the assets assigned to the approval authority, and wherein the approval authority, upon accessing the web-based registry, may update and review the status of the assets assigned;

upon logging on to a password controlled website configured to provide access to the fire hydrant management software, providing to an inspector the owner selects, the selection based upon a list of qualified inspectors that are available to inspect the asset based upon attributes including proximity to the asset, a web-based template configured to describe the asset an each of the steps of the inspection;

receiving from the inspector, inspection information in specific response to the web-based template;

storing in a database in association with the asset, the inspection information, wherein the inspection information is accessible to the users, and updating the database in association with the asset based upon the inspection information;

transmitting to the approval authority, a standard format compliance report including noting compliance, wherein the compliance report includes, noting deficiencies in the asset and storing the noted deficiencies in association with the asset.

9. The method of claim 8, wherein the storing further includes:

storing, in association with the asset a new deadline date, based upon completion of the inspection.

10. The method of claim 9 further comprising:

receiving bids to perform a suitably compliant inspection of the asset from a group of qualified inspectors including, at least, the inspector; and presenting to the owner a compilation of the bids for selection of the inspector.

11. The method of claim 10 further comprising:

based upon the owner selecting the inspector, scheduling the inspector's inspection of the asset based upon the impending deadline, the inspector's availability, and the asset availability.

12. The method of claim 8, wherein the compiling the report includes:

receiving, from the inspector, photographs of the asset or components of the asset; and storing the photographs in association with the asset and the date of the inspection.

13. The method of claim 8, wherein the noting deficiencies further comprises:

selecting a remedy deficiency deadline based upon the noted deficiency and the date of the inspection; and storing in association with the asset a remedy deficiency deadline.

14. The method of claim 13, further comprising receiving bids to perform a suitably compliant remedy of the deficiency from a group of qualified contractors; and presenting to the owner a compilation of the bids for selection of a contractor to remedy the deficiency.

15. The method of claim 14 further comprising:

based upon the owner selecting the contractor, scheduling the contractor to remedy the deficiency based upon the remedy deficiency deadline, the contractor's availability, and the asset availability.

16. The method of claim 8, further comprising:

compiling compliance report including the noted deficiency.

\* \* \* \* \*